United States Patent
Alphenaar et al.

(10) Patent No.: US 10,692,022 B2
(45) Date of Patent: *Jun. 23, 2020

(54) METHOD AND SYSTEM FOR COLLECTING AND ANALYZING OPERATIONAL INFORMATION FROM A NETWORK OF COMPONENTS ASSOCIATED WITH A LIQUID ENERGY COMMODITY

(71) Applicant: Genscape Intangible Holding, Inc., Louisville, KY (US)

(72) Inventors: Deirdre Alphenaar, Prospect, KY (US); Walter F. Jones, Crestwood, KY (US); Abudi Zein, Jersey City, NJ (US)

(73) Assignee: Genscape Intangible Holding, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,603

(22) Filed: Dec. 13, 2017

(65) Prior Publication Data

US 2018/0101796 A1     Apr. 12, 2018

Related U.S. Application Data

(63) Continuation of application No. 14/215,384, filed on Mar. 17, 2014, now Pat. No. 9,886,673, which is a
(Continued)

(51) Int. Cl.
  *G06Q 10/06*     (2012.01)
  *G01F 23/292*    (2006.01)
  (Continued)

(52) U.S. Cl.
  CPC .......... *G06Q 10/0631* (2013.01); *F17D 1/08* (2013.01); *F17D 3/00* (2013.01); *F17D 3/01* (2013.01);
  (Continued)

(58) Field of Classification Search
  None
  See application file for complete search history.

(56) References Cited

U.S. PATENT DOCUMENTS 6,542,704 B2 * 4/2003 Suetsugu ............ G03G 15/105
                                                     399/57
6,722,207 B1   4/2004 Feller
(Continued)

FOREIGN PATENT DOCUMENTS

| EP | 2175420 A1 | 4/2010 |
| WO | 84/03488 A1 | 9/1984 |
| WO | 97/46855 A1 | 12/1997 |

OTHER PUBLICATIONS

Servico Publico Federal Ministerio Da Economia Instituto Nacional Da Propriedade Industrial (Brazil), Office Action issued in corresponding Application No. BR112013021047-8, dated Oct. 11, 2019.
(Continued)

*Primary Examiner* — Kate H Luo
(74) *Attorney, Agent, or Firm* — Stites & Harbison, PLLC; David W. Nagle, Jr.

(57) ABSTRACT

A method for collecting and analyzing operational information from a network of components associated with a liquid energy commodity comprises the steps of: (a) measuring an amount of the liquid energy commodity in storage at one or more storage facilities in the network, and storing that measurement data; (b) determining a flow rate of the liquid energy commodity in one or more selected pipelines in the network, and storing that flow rate data; (c) ascertaining an operational status of one or more processing facilities in the network, and storing that operational status information; (d) analyzing the measurement data, the flow rate data, and the operational status information to determine a balance of the liquid energy commodity in the network or a selected portion thereof at a given time; and (e) communicating
(Continued)

information about the balance of the liquid energy commodity to a third-party market participant.

14 Claims, 11 Drawing Sheets

Related U.S. Application Data continuation of application No. 13/398,268, filed on Feb. 16, 2012, now Pat. No. 8,717,434.

(60) Provisional application No. 61/443,510, filed on Feb. 16, 2011.

(51) Int. Cl.

| | |
|---|---|
| *G01F 15/06* | (2006.01) |
| *F17D 3/18* | (2006.01) |
| *F17D 1/08* | (2006.01) |
| *F17D 3/01* | (2006.01) |
| *F17D 3/00* | (2006.01) |
| *G01F 1/00* | (2006.01) |
| *G01F 23/00* | (2006.01) |

(52) U.S. Cl.
CPC ............ *F17D 3/18* (2013.01); *G01F 23/2925* (2013.01); *G01F 1/00* (2013.01); *G01F 15/06* (2013.01); *G01F 23/00* (2013.01); *Y02P 90/82* (2015.11)

(56) References Cited

U.S. PATENT DOCUMENTS

| | | | | |
|---|---|---|---|---|
| 6,771,058 | B2* | 8/2004 | Lapinksi | G01R 15/142 324/117 R |
| 7,376,522 | B2* | 5/2008 | Lapinski | G01F 1/666 340/606 |
| 2002/0035551 | A1* | 3/2002 | Sherwin | G06Q 10/06 705/412 |
| 2006/0157142 | A1* | 7/2006 | Hillam | B67D 7/3209 141/198 |
| 2007/0273725 | A1* | 11/2007 | Furukawa | B41J 2/1721 347/36 |
| 2007/0294034 | A1 | 12/2007 | Bratton et al. | |
| 2009/0312963 | A1* | 12/2009 | Najim Al-Khamis | G01N 9/26 702/47 |
| 2010/0042527 | A1* | 2/2010 | Mitchell | G01W 1/10 705/35 |
| 2010/0086172 | A1* | 4/2010 | Venkoparao | G06T 7/0004 382/100 |
| 2011/0012778 | A1* | 1/2011 | Nguyen | G01S 7/414 342/25 A |

OTHER PUBLICATIONS

Intellectual Property India, Examination Report issued in corresponding Application No. 7528/DELNP/2013, dated Mar. 31, 2019.

\* cited by examiner

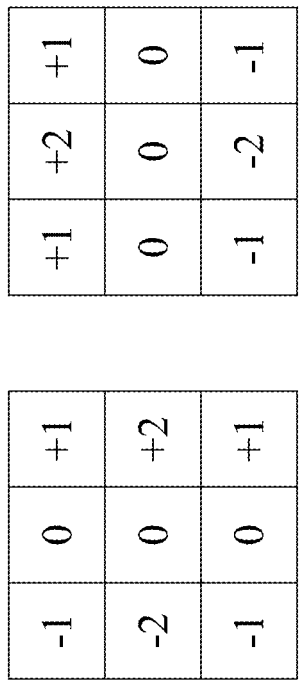
FIG. 5
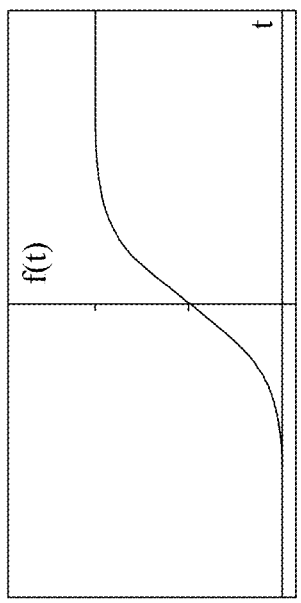
FIG. 6
FIG. 7

METHOD AND SYSTEM FOR COLLECTING AND ANALYZING OPERATIONAL INFORMATION FROM A NETWORK OF COMPONENTS ASSOCIATED WITH A LIQUID ENERGY COMMODITY

CROSS-REFERENCE TO RELATED APPLICATIONS

The present application is a continuation of U.S. patent application Ser. No. 14/215,384 filed on Mar. 17, 2014, which is a continuation of U.S. patent application Ser. No. 13/398,268 filed on Feb. 16, 2012, which claims priority to U.S. Provisional Patent Application Ser. No. 61/443,510 filed on Feb. 16, 2011, the entire disclosures of which are incorporated herein by reference.

BACKGROUND OF THE INVENTION

The present invention is a method and system for collecting and analyzing operational information from a network of components associated with a liquid energy commodity, such as crude oil or natural gas liquid (NGL).

Liquid energy commodities, such as crude oil, comprise a multi-billion dollar economic market. These commodities are bought and sold by many parties, and as with any traded market, information about the traded commodities is very valuable to market participants. Specifically, the operations of the various components and facilities of the production, transportation, storage, and distribution systems for each of these commodities can have significant impacts on the price and availability of these commodities, making information about said operations valuable. Furthermore, such information generally is not disclosed publicly by the various component owners or operators, and access to said information is therefore limited.

Certain data is collected by organizations such as the United States Energy Information Administration ("EIA"), typically via surveys of selected owners and/or operators. However, the length of time required to collect and compile this data and then disseminate it to the public or market participants can range from days to months, so that the collected and compiled data is usually delayed and of limited value for short-term trading purposes.

SUMMARY OF THE INVENTION

The present invention is a method and system for collecting and analyzing operational information from a network of components associated with a liquid energy commodity, such as crude oil or natural gas liquid (NGL).

In accordance with the method and system of the present invention, sensors or measurement devices are deployed at various points in a network to collect data. The method then generally comprises the steps of: (a) measuring an amount of the liquid energy commodity in storage at one or more storage facilities in the network, and storing that measurement data in a first database at a central data processing facility; (b) determining a flow rate of the liquid energy commodity in one or more selected pipelines in the network, and storing that flow rate data in a second database at the central data processing facility; (c) ascertaining an operational status of one or more processing facilities in the network, and storing that operational status information in a third database at the central data processing facility; (d) analyzing the measurement data, the flow rate data, and the operational status information to determine a balance of the liquid energy commodity in the network or a selected portion thereof at a given time; and (e) communicating information about the balance of the liquid energy commodity to a third-party market participant.

With respect to storage facilities, at each selected storage facility in a particular network, there is a measurement of the amount of crude oil or other liquid energy commodity in storage. For instance, most crude oil is stored in large, above-ground tanks that either have: a floating roof, which is known as an External Floating Roof (EFR); or a fixed roof with a floating roof internal to the tank, which is known as an Internal Floating Roof (IFR). Thus, each tank in a particular location can be researched using publicly available resources or visual inspection, and all relevant information about each tank, including volume capacity information, tank type (i.e., floating roof or fixed roof), and physical dimensions, is stored in a database. Then, on a predetermined schedule, an inspection of each tank at the particular location is conducted that includes the collection of one or more photographic images (i.e., visible spectrum) or video of each tank, and/or the collection of infrared images or video of each tank. The collected photographic images and the collected infrared images of each tank are then transmitted to a central processing facility for analysis to obtain a measurement of the amount of crude oil or other liquid energy commodity in storage.

With respect to pipelines, in order to maintain the pressure of the liquid energy commodity, pumping stations are positioned along pipelines. The pumps used at each of these pumping stations are typically electrically driven induction motors. In order to perform a remote determination of the amount and rate of flow in a particular pipeline at a given time, one preferred form of analysis is based on monitoring the real-time electric power consumption of some number of pumping stations along a selected pipeline. In one exemplary implementation, a monitoring device is deployed and used to monitor one or more power lines supplying electric power to each selected pumping station. The monitoring device is primarily comprised of sensing elements responsive to electric potential and the magnetic flux densities associated with the one or more power lines, therefore allowing for periodic or continuous measurements of the electric potential and magnetic flux densities associated with the one or more power lines, and thus a determination of power. Data from such monitoring devices is then transmitted to the central data processing facility. At the central data processing facility, a model of the pipelines and the pumping stations in the particular network is developed that includes computations of the elevation gain or loss between any monitored pumping station and the next pumping station downstream using standard geographical elevation data. The pressure differential between the output or discharge side of any particular monitored pumping station and the input side of the next station downstream is then estimated. A range of possible flow rates for the pipeline from minimum possible flow to maximum possible flow for the pipeline is plotted versus the equivalent expected power consumption at the monitored pumping station.

Once such power consumption determinations have been made for any particular pumping station, power changes at each pumping station can be correlated to changes in flow through each pumping station. Thus, since the monitoring devices described above allow for periodic or continuous measurements of power consumed at a particular pumping station, the collected data from those monitoring devices can be used to determine flow through and between pumping stations.

With respect to processing facilities, a liquid energy commodity enters a refinery or other processing facility at some point in the network. In the method and system of the present invention, the operational status of such processing facilities is ascertained. One preferred method for monitoring the operation of processing facilities is by using fixed thermal imaging cameras. A thermal imaging camera can acquire thermal data and record images of emissions and heat signatures of various key units that can be used to ascertain whether a processing facility is functioning as expected or not.

With data and information about the three fundamental components of a particular network—(i) storage facilities, (ii) pipelines, and (iii) processing facilities—it is possible to determine total "balances" of the liquid energy commodity. For example, "balances" of interest to market participants with respect to crude oil include, but are not limited to: the amount of crude oil in storage in a given market region at a given time; the amount of crude oil flowing into a market region from adjacent market regions; and/or the amount of crude oil being processed into gasoline and other petroleum products. Once such an analysis has been completed, information about the balance of the crude oil or other liquid energy commodity in the network can be communicated to market participants and other interested parties, i.e., third parties who would not ordinarily have ready access to such information.

DESCRIPTION OF THE DRAWINGS

FIG. 5 is a graph that illustrates the one-dimensional shape of an edge in an image;

FIG. 6 includes a pair of 3×3 convolution masks used in a Sobel edge detection method;

FIG. 7 illustrates how a convolution mask in a Sobel edge detection method is applied to an input image;

DETAILED DESCRIPTION OF THE INVENTION

Figure 1:
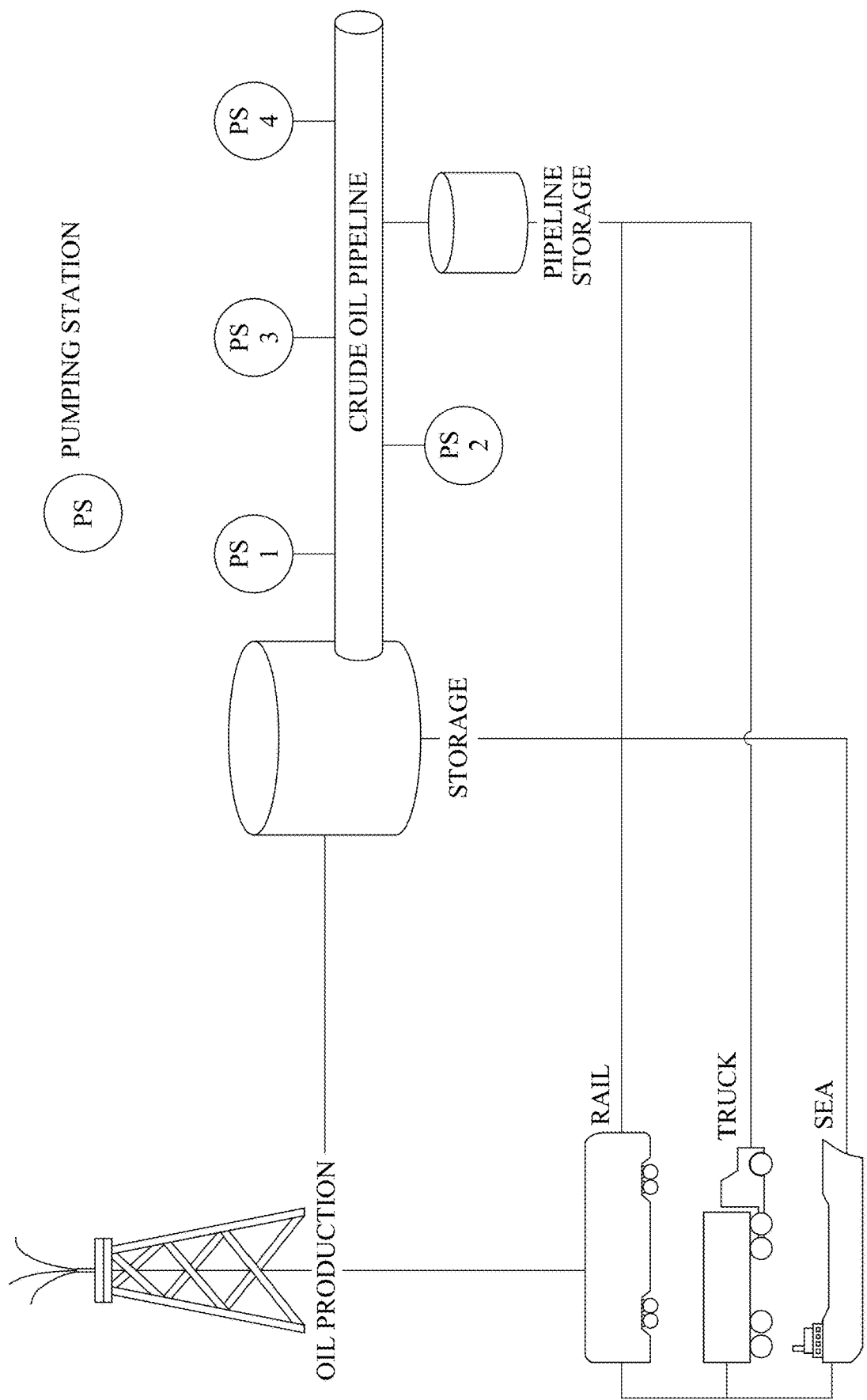
FIG. 1 is a schematic view of an exemplary network associated with crude oil production.

The present invention is a method and system for collecting and analyzing operational information from a network of components associated with a liquid energy commodity, such as crude oil or natural gas liquid (NGL).

For example, since crude oil is a fossil fuel, it is typically drilled or mined at locations where there are naturally occurring deposits or reservoirs. Once collected at such a location (for example, from a well), the crude oil is typically pumped directly into a pipeline or stored in above-ground storage (e.g., tanks) or underground storage (e.g., salt dome caverns). From such storage facilities, it can then be transported via pipelines to refineries or other processing facilities for processing. Thus, there is an interconnected network of crude oil wells, crude oil pipelines, crude oil storage facilities, and crude oil refineries.

For another example, natural gas is extracted at locations where there are naturally occurring reservoirs. The extracted natural gas is then processed into "dry" natural gas or "wet" natural gas at processing plants, the latter of which is termed natural gas liquid (NGL). The NGL is then transported using NGL pipelines and stored at NGL storage sites. The NGL may then be separated into at what are termed "purity" products such as ethane, propane, and butane. These NGL products can then be processed at ethylene cracking facilities which take NGL products in and process them into petrochemical industry feedstocks such as ethylene, propylene, etc.

In accordance with the method and system of the present invention, sensors or measurement devices are deployed at various points in a network to collect data. The method then generally comprises the steps of: (a) measuring an amount of the liquid energy commodity in storage at one or more storage facilities in the network, and storing that measurement data in a first database at a central data processing facility; (b) determining a flow rate of the liquid energy commodity in one or more selected pipelines in the network, and storing that flow rate data in a second database at the central data processing facility; (c) ascertaining an operational status of one or more processing facilities in the network, and storing that operational status information in a third database at the central data processing facility; (d) analyzing the measurement data, the flow rate data, and the operational status information to determine a balance of the liquid energy commodity in the network or a selected portion thereof at a given time; and (e) communicating information about the balance of the liquid energy commodity to a third-party market participant.

As will become clear in the description that follows, many of the operational steps of the method and system of the present invention, including the collection of data and the various computational steps associated with the analysis of that collected data, are preferably achieved through the use of a digital computer program, i.e., computer-readable instructions stored and executed by a computer. Thus, execution of the requisite routines and subroutines can be carried out using standard programming techniques and languages. With benefit of the following description, such programming is readily accomplished by one of ordinary skill in the art.

Figure 2:
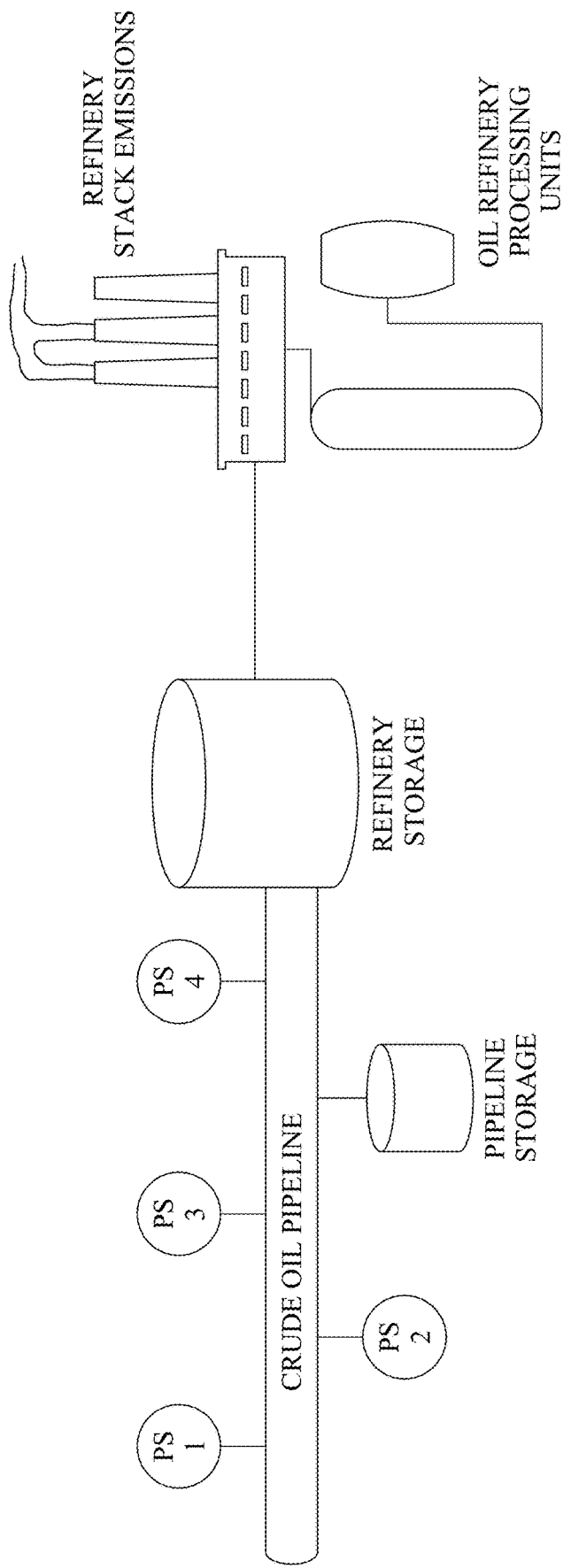
FIG. 2 is a schematic view of an exemplary network associated with crude oil transport and processing.

For example, with respect to crude oil, there is an interconnected network of crude oil wells, crude oil pipelines, crude oil storage facilities, and crude oil refineries. For purposes of the subsequent discussion, and as shown in FIGS. 1 and 2, a "network" for crude oil can thus be characterized as having three fundamental components: (i) crude oil storage facilities; (ii) crude oil pipelines; and (iii) crude oil refineries or other processing facilities. Understanding and collecting information about the operation of these components and the flow of crude oil between these components allows for the modeling of the network and monitoring of the real-time network dynamics. In other words, by taking certain physical measurements of the crude oil (or other liquid energy commodity) at various points in the network, it is possible to determine total "balances" of the crude oil in different functional parts of the network. For example, "balances" of interest to market participants with respect to crude oil include, but are not limited to: the amount of crude oil in storage in a given market region at a given time; the amount of crude oil flowing into a market region from adjacent market regions; and/or the amount of crude oil being processed into gasoline and/or other petroleum products.

Referring still to the crude oil market, in the U.S., the amount of crude oil stored in tanks located at either terminals, storage hubs, or oil refineries (including crude oil in transit in pipelines) is of the order of 340 million barrels. 55,000 miles of pipelines transport crude oil from American production wells (notably in the states of Texas, Louisiana, Oklahoma, and Wyoming), import terminals (notably seaports in the Gulf of Mexico), or overland across the border from Canada to various regional markets. These markets are divided into five large regions in the U.S. known as Petroleum Administration for Defense (PAD) Districts. Crude oil pipelines typically vary in diameter from eight to thirty inches. Larger inter-regional pipelines, which service refineries or storage hubs, are generally more relevant to overall market dynamics than smaller intra-regional pipelines. The market relevance of crude oil in storage varies depending on the purpose of the crude oil being stored. For example, crude oil stored at refineries is available for refining at any particular point in time into gasoline and/or other petroleum products. Crude oil stored at major oil storage hubs may be indicative of the amount of crude oil being stored by financial speculators or by suppliers to refineries downstream of the storage hub. Other tank storage may be primarily used to maintain appropriate pressures and volumes in order to successfully operate the required flow dynamics on a particular pipeline.

Storage Facilities

In accordance with the method and system of the present invention, at each selected storage facility in a particular network, there is a measurement of the amount of crude oil or other liquid energy commodity in storage. For instance, one preferred method for measuring the amount of crude oil being stored in a particular tank is described in commonly owned and co-pending U.S. patent application Ser. No. 13/089,674 entitled "Method and System for Determining an Amount of Crude Oil Stored in a Particular Location," which is incorporated herein by reference.

As described in U.S. patent application Ser. No. 13/089,674, most crude oil is stored in large, above-ground tanks that either have: a floating roof, which is known as an External Floating Roof (EFR); or a fixed roof with a floating roof internal to the tank, which is known as an Internal Floating Roof (IFR). Thus, each tank in a particular location can be researched using publicly available resources or visual inspection, and all relevant information about each tank, including volume capacity information, tank type (i.e., floating roof or fixed roof), and physical dimensions, is stored in a database. Then, on a predetermined schedule, an inspection of each tank at the particular location is conducted that includes the collection of one or more photographic images (i.e., visible spectrum) or video of each tank, and/or the collection of infrared images or video of each tank. Such images can be collected by aerial means, through use of ground-placed, fixed cameras, or via satellite imaging. In the case of an aerial image acquisition, such as a helicopter flyover, the helicopter preferably flies a defined and repeatable flight route and adheres to a pre-defined sequence for image acquisition, which facilitates the subsequent analysis. Alternatively, fixed thermal imaging cameras may take infrared images at predetermined intervals. In any event, the collected photographic images and the collected infrared images of each tank are then transmitted to a central processing facility for analysis.

With respect to the analysis of a tank with a floating roof, one preferred form of analysis is to determine the height of the roof relative to the top of the selected tank using standard image pixel number determination techniques. For example, tank levels can be measured by drawing two vertical lines, such as L1 and L2. When measuring tank levels for floating roof tanks, the L1 line is drawn on the inside of the tank from the top of the tank down to the top of the lid and approximates the height the roof has been lowered. The L2 line is drawn on the outside of the tank from the top of the tank down to the bottom of the tank and approximates the height of the tank. The respective lengths of the L1 and L2 lines are then measured. Such measurement is optimized, for example, by ensuring an appropriate camera angle and distance from the tank, using high-resolution equipment for image acquisition, and/or ensuring consistent and proper placement of the L1 and L2 lines on the image.

Based on the determined height of the roof (which is indicative of the liquid level) and the stored volume capacity information and/or the stored physical dimensions of the selected tank, the amount of crude oil in the tank can be calculated. For example, if the roof is at the halfway point, i.e., at a 50% height relative to the top of a 200,000-barrel tank, and the tank has a typical cylindrical construction with a constant diameter from the base to the top, it is calculated that 100,000 barrels of crude oil are in the tank. Stated another way, tank level percent of capacity can be calculated by $1-(D1/D2)$, where D1 and D2 are the respective measured lengths of L1 and L2 in image pixels. Tank level percent of capacity is then multiplied by the tank capacity to calculate the number of barrels of crude oil in the tank.

With respect to the analysis of a tank with a floating roof, in another preferred form of image analysis, the top, roof, and the base of a tank are identified in either a photographic image or infrared image. Automated elliptical form fitting or detection algorithms employing mathematical transformations, such as a Hough transform, can then be used to fit an elliptical plane on each of the top, roof, and the base of the tank. Based on the determined height of the roof relative to the base and/or the top of the tank (which again is indicative of the liquid level) and the stored volume capacity information and/or the stored physical dimensions of the selected tank, the amount of crude oil in the tank can again be calculated.

With respect to tanks with fixed roofs, the liquid level within a selected tank can be ascertained from the collected infrared images, as the temperature of the stored oil is different than that of the gas above it in the tank. One preferred form of analysis to determine the height of the liquid level in the tank is to measure the pixel distance from the liquid-gas boundary to the base of the tank. Based on the ascertained liquid level within the tank and the stored volume capacity information and/or the stored physical dimensions of the selected tank, the amount of crude oil in the tank can again be calculated.

Furthermore, with respect to tanks with fixed roofs and determination of liquid level from the collected infrared images, one particular method of analysis is described in detail below.

In this particular method of analysis, infrared images are collected for each tank of interest at selected intervals (e.g., every five minutes) and transmitted to the central data processing facility for analysis. Although the camera that collects the infrared images is preferably fixed in position, it is acknowledged that there is often some minor movement of the camera. Thus, feature detection is used to find the tank location in each infrared image, thus ensuring an accurate calculation of the amount of crude oil in the tank.

Edges in images are areas with strong intensity contrasts, i.e., a significant change in intensity from one pixel to the next. There are various methods and techniques for detecting edges in an image, which can be generally grouped into two categories: gradient and Laplacian methods. A gradient method detects the edges by looking for the maximum and minimum in the first derivative of the image. A Laplacian method searches for zero crossings in the second derivative of the image to find edges.

Referring now to FIG. 5, an edge has the one-dimensional shape of a ramp. Employing a gradient method, the derivative of the one-dimensional shape thus shows a maximum located at the center of the edge. Based on this one-dimensional analysis, the theory can be carried over to two dimensions as long as there is an accurate approximation to calculate the derivative of a two-dimensional image. In this case, a Sobel operator is used to perform a two-dimensional spatial gradient measurement on a particular infrared image in order to find the approximate absolute gradient magnitude at each point in the infrared image. See R. Gonzalez and R. Woods, *Digital Image Processing*, Addison Wesley (1992), pp. 414-428. The Sobel edge detection method uses a pair of 3×3 convolution masks (FIG. 6), one estimating the gradient in the x-direction (columns) (Gx) and the other estimating the gradient in the y-direction (rows) (Gy). A convolution mask is usually much smaller than the actual image. As a result, the mask is applied and slid over the image, manipulating a square of pixels at a time.

Specifically, in use, the mask is slid over an area of the input image (from the beginning of a row), changes the value of the pixel and shifts one pixel to the right, and then continues to the right until it reaches the end of the row. It then starts at the beginning of the next row. FIG. 7 illustrates how a convolution mask in a Sobel edge detection method is applied to an input image, with the mask being applied over the top left portion of the input image and equation (1) below being used to calculate a particular pixel in the output image. The center of the mask is placed over the pixel that is being manipulated in the image; for example, pixel ($a_{22}$) is converted to pixel ($b_{22}$) by:

$$b_{22}=(a_{11}*m_{11})+(a_{12}*m_{12})+(a_{13}*m_{13})+(a_{21}*m_{21})+ (a_{22}*m_{22})+(a_{23}*m_{123})+(a_{31}*m_{31})+(a_{32}*m_{32})+ (a_{33}*m_{33}) \quad (1)$$

The Gx mask highlights the edges in the horizontal direction, while the Gy mask highlights the edges in the vertical direction. After taking the magnitude of both and adding, the resulting output detects edges in both directions.

Figure 3:
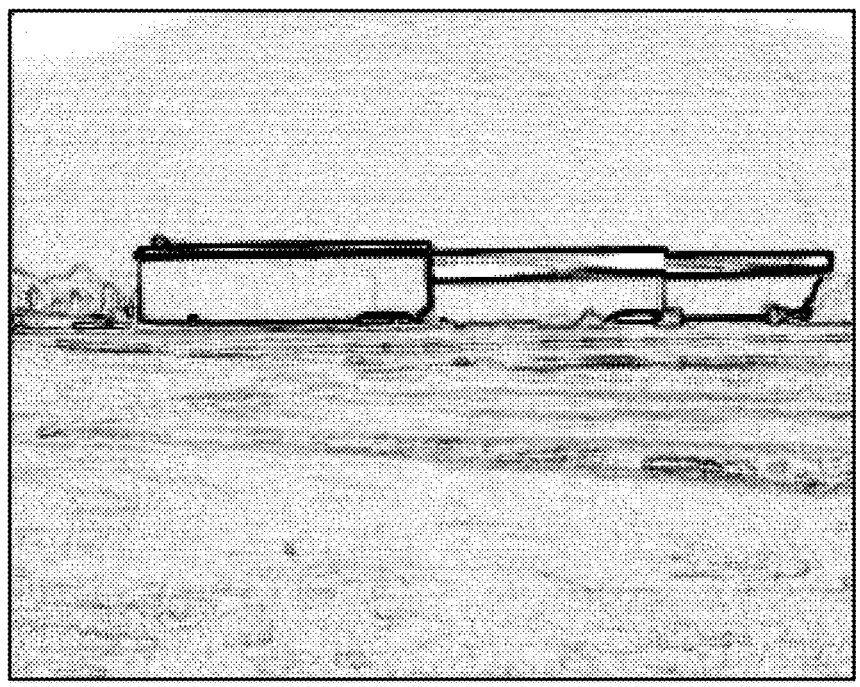
FIG. 3 is an exemplary image in which the outline of three tanks has been found and marked on the image using the Sobel edge detection method.

In practice, a Sobel edge detection image is computed for each collected infrared image. Then, for each edge detection image, the tank location is found by determining the best fit to one or more features. Each feature is a set of pixel locations where the Sobel edge detection image should contain an edge and have a black color. FIG. 3 is an exemplary image in which the outline of three tanks has been found and marked on the image using the Sobel edge detection method, and FIG. 4 shows how this outline of three tanks can be overlaid on a subsequent collected image.

Figure 4:
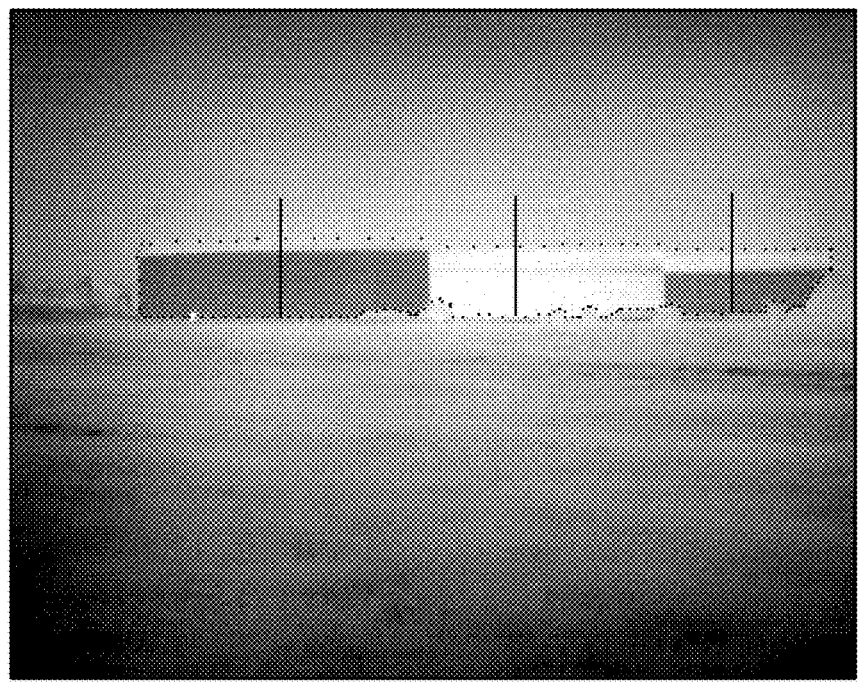
FIG. 4 is an exemplary image with the outline of three tanks from FIG. 3 overlaid on a subsequent collected image.

In this particular method of analysis, after finding the tank location, the tank level is computed based on a vertical line starting at the bottom of each tank, as also shown in FIG. 4. Each vertical line is searched upward from the bottom of the tank for the next edge location, which is the oil level location. The number of pixels between the bottom of the tank and the oil level location (pixel_height) is used to compute the tank percent full as follows:

$$\text{Percent Full}=100*(\text{pixel\_height})/(\text{total pixel height of tank}) \quad (2)$$

Furthermore, in this particular method of analysis, the flow rate with respect to a certain tank can be calculated by the rate of change of the storage levels within the tank:

$$\text{Flow}\_i=(S\_i-S\_i-1)*\text{Tank\_Capacity}*24/100 \quad (3)$$

$$\text{where } S\_i=(L\_i+L\_i-1+L\_i-2+L\_i-3+L\_i-4+L\_i-5+ L\_i-6)/7 \quad (4)$$

$$\text{and } S\_i-1=(L\_i-1+L\_i-2+L\_i-3+L\_i-4+L\_i-5+L\_i-6+ L\_i-7)/7 \quad (5)$$

where Tank_Capacity is in barrels, and L_i is the tank Percent Full at hour i.

When Flow_i<0, then Flow_i is set to zero since only oil flowing in to a tank is being considered.

No matter which technique of analysis is employed, the objective again is to obtain a measurement of the amount of crude oil in storage in the particular network, which is stored at the central data processing facility.

With respect to storage of NGL products, such as ethane, propane, and butane, similar image collection and analysis on the vertical and horizontal tanks commonly used to store such products can be carried out in order to obtain a measurement of the amount of the NGL product in storage in the particular network.

Pipelines

Along with measuring the amount of crude oil or other liquid energy commodity in storage in a particular network, there is a determination of the amount and rate of flow in selected pipelines in the particular network.

For instance, a large inter-regional crude oil pipeline typically runs for hundreds of miles. In order to maintain the pressure of the flowing crude oil, crude oil pumping stations are typically constructed every 80-100 miles. The pumps used at each of these pumping stations are typically electrically-driven induction motors, with horsepower (hp) ranging from 500-4500 hp. Crude oil pipeline flow data in real-time is generally only known to the owners, operators, and shippers on the pipeline. In order to perform a remote determination of the amount and rate of oil flow in a particular pipeline at a given time, one preferred form of analysis is based on monitoring the real-time electric power consumption of some number of pumping stations along a selected pipeline.

Specifically, in one exemplary implementation, a monitoring device is deployed and used to monitor one or more power lines supplying electric power to each selected pumping station. The monitoring device (also referred to herein as "power monitoring device") is primarily comprised of sensing elements responsive to electric potential and the magnetic flux densities associated with the one or more power lines, therefore allowing for periodic or continuous measurements of the electric potential and magnetic flux densities associated with the one or more power lines, and thus a determination of power. The construction and use of such monitoring devices is described in commonly owned U.S. Pat. No. 6,771,058 entitled "Apparatus and Method for the Measurement and Monitoring of Electrical Power Generation and Transmission," and U.S. Pat. No. 6,714,000 entitled "Apparatus and Method for Monitoring Power and Current Flow," each of which is incorporated herein by reference.

Data from such monitoring devices is then transmitted to a central data processing facility. At the central data processing facility, a model of the pipelines and the pumping stations in the particular network is developed that includes computations of the elevation gain or loss between any monitored pumping station and the next pumping station downstream using standard geographical elevation data. The pressure differential between the output or discharge side of any particular monitored pumping station and the input side of the next station downstream is then estimated. The pressure change calculations also take typical minimum and maximum pressures for the pipeline into account for use as reasonable computation boundary values.

For example, a preferred flow model takes into account the pipeline length and elevation change between a monitored pumping station and the next pumping station downstream. The pipeline length, elevation change, and power usage are used to estimate the pressure differential between the output side of the first pumping station and the input side of the next pumping station downstream. In other words, the frictional pressure differential or head loss (HeadLoss (H) in feet) between any two pumping stations on a selected pipeline can be calculated from the variables set forth below. See *Pipeline Rules of Thumb Handbook*, Gulf Professional Publishing (5th Edition) (2001).

Sg=Specific Oil Gravity (API)
Q=Flow Rate (gal/min)
H=Head Differential at Pump (ft)
D=Diameter of Pipe (ft)
L=Length of Pipeline Segment (ft)
E=Pump Efficiency
V=Oil Velocity (ft/sec)
KV=Kinematic Viscosity (cSt)
HeadLoss=Head Loss (ft)

The flow rate (Q) values range from zero to the maximum flow rate of the pipeline. The flow rate (Q) is related to oil velocity as follows:

$$Q = \text{Flow Rate} = \frac{(bbls/\text{day})}{(60*24*0.0238095)} = \frac{(bbls/\text{day})}{34.286} = \left(\frac{\text{gal}}{\text{min}}\right) \quad (6)$$

$$V = \text{Velocity(ft/sec)} = \frac{Q*0.1336805}{60*\pi*D^2/4} = \frac{0.002836788*Q}{D^2} \quad (7)$$

To obtain the kinematic viscosity, a CentiStokes (cSt) value is based on an assumption of API and temperature, and then is converted into units of (ft²/sec):

$$KV = \text{Kinematic viscosity(ft}^2\text{/sec)} = \frac{(cSt)*10.0763910}{1000000} \quad (8)$$

Fanning's equation is then used to compute the frictional pressure drop (HeadLoss) between pumping stations for a given flow rate (Q), pipeline segment length (L) and elevation profile. Fanning's equation for expressing the frictional pressure drop of oil flowing in a pipeline is a function of a frictional loss (f) derived from the Reynolds number (Re).

$$\text{HeadLoss(ft)} = f\frac{L}{D}\frac{V^2}{2*g} = \frac{f*V^2*L}{2*32.174*D} \quad (9)$$

$$Re = \text{Reynolds number} = \frac{V*D}{KV} \quad (10)$$

$$f = \text{friction loss} = \left\{ \text{if } Re \le 2200 \; f = \frac{64}{Re}, \text{otherwise use Table 1} \right. \quad (11)$$

TABLE 1

| Re >2200 (Turbulent Flow) | |
|---|---|
| Re | f |
| 2500 | 0.045 |
| 3000 | 0.043 |
| 3500 | 0.041 |
| 4000 | 0.039 |
| 4500 | 0.038 |
| 5000 | 0.036 |
| 5500 | 0.035 |
| 6000 | 0.035 |
| 7000 | 0.033 |
| 8000 | 0.032 |
| 9000 | 0.031 |
| 10000 | 0.03 |
| 15000 | 0.027 |
| 20000 | 0.025 |
| 25000 | 0.024 |
| 30000 | 0.023 |
| 40000 | 0.021 |
| 50000 | 0.02 |
| 60000 | 0.019 |
| 80000 | 0.018 |
| 100000 | 0.017 |
| 150000 | 0.016 |
| 200000 | 0.015 |
| 1000000 | 0.012 |
| 10000000 | 0.01 |

The hydraulic horsepower required to pump oil along a particular pipeline segment is computed as follows, where H is head differential (ft) on the discharge side of the pump:

$$HP = \text{Horsepower} = \frac{Sg*Q*H}{3960*E} \quad (12)$$

The pump efficiency (F) is estimated to range between 0.25 and 0.40. The power consumed by any particular pump can then be computed directly from pump horsepower using a horsepower to power unit conversion factor c, which is equal to 0.000746.

$$MW = \text{Megawatt} = HP*0.000746 \quad (13)$$

Using equations (12) and (13) and setting H=(HeadLoss) (from equation (9)), a range of possible flow rates (Q) for the pipeline from minimum possible flow to maximum possible flow for the pipeline is plotted versus the equivalent expected power consumption at the monitored pumping station.

For example, for a major U.S. pipeline flowing from the Gulf Coast to a major U.S. storage hub in Oklahoma, flow rates can range from 0 to 350,000 barrels per day, with the diameter of the pipeline (D)=2.44 feet. For a monitored pumping station at location x, the distance of the line (L) from that pumping station to the next downstream pumping station at location y=368,062 feet. For a typical mid-range flow rate for the pipeline of 200,000 barrels per day, the corresponding flow rate Q (gallons/minute)=5833.28. The kinematic viscosity v=0.004 centiStokes. The elevation difference between pumping station x and pumping station y=353 feet. The resultant head loss (HeadLoss) is 181.1 feet.

Figure 8:
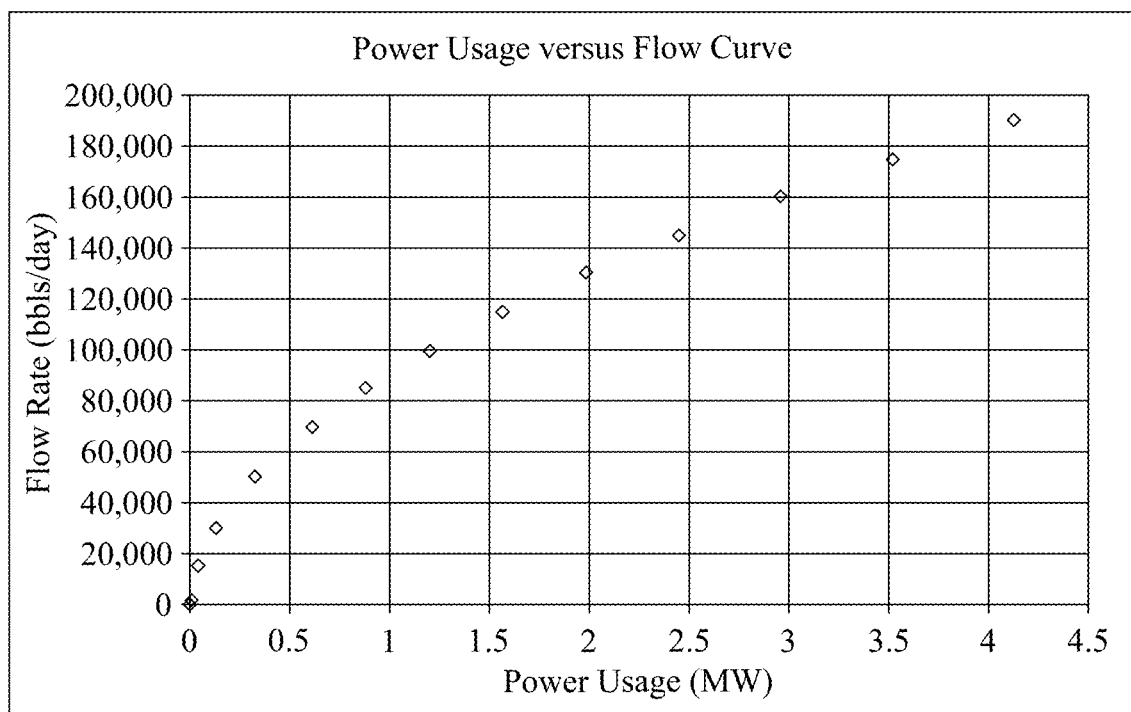
FIG. 8 is a plot of flow rate (barrels per day) against expected power consumption (MW) for an exemplary pumping station.

A plot of flow rate (barrels per day) against expected power consumption (MW) is shown in FIG. 8.

Once such power consumption determinations have been made for any particular pumping station, power changes at each pumping station can be correlated to changes in flow through each pumping station. Thus, since the monitoring devices described above allow for periodic or continuous measurements of power consumed at a particular pumping station, the collected data from those monitoring devices can be used to determine flow through and between pumping stations.

Once the flow rate between consecutive pumping stations has been computed, one preferred method of deriving total pipeline flow is to compute an average of the estimated flow rates at several pumping stations to determine the flow rate on the pipeline as a whole. The approach is often used when fewer than half the pumping stations are monitored on a given pipeline.

Another preferred method of deriving total pipeline flow uses Monte Carlo simulations to model power usage at all pumping stations along a given pipeline and is used when half or more than half of the pumping stations are monitored. The simulations use inputs from the monitored pumping stations, as well as predictions of power usage at pumping stations along the pipeline which are not monitored. The power usage at the unmonitored pumping stations is modeled with a uniform distribution from zero to a maximum power usage based on the number of pumps and the type of pumps at each pumping station. For a given flow value, each Monte Carlo simulation uses the same observed power usage for the monitored pumping stations and performs a random sample of the power usage uniform distributions for the unmonitored pumping stations. Equations (6) to (13) are used to simulate pressure head profile along the entire pipeline. If the pressure head profile along the pipeline goes below the minimum pressure or above the maximum pressure, the simulation is flagged as invalid. The pipeline flow regime, zero barrels per day to capacity, is divided in a finite number of intervals. For each flow value at the center of each flow interval, a large number of Monte Carlo simulations are performed and the number of valid simulations is recorded. An overall pipeline flow is computed using the following expected value:

$$\frac{\sum f\_i * v\_i}{Totv} \quad (14)$$

where f_i is $i^{th}$ flow value
v_i is the number of valid simulations for f_i, and
Totv is the total number of valid simulations for all flow intervals.

Finally, in certain circumstances, it may be impossible or impractical to monitor real-time electric power consumption of some number of pumping stations along a selected pipeline. However, it would still be advantageous to know whether a particular pumping station was on or off. Accordingly, a thermal imaging camera (like those used for monitoring storage facilities, as described above) may be used to assess the on/off condition of one or more pumping stations. Similarly, although electrically-driven induction motors are commonly used at pumping stations, some pumps may be driven by gas or diesel-powered motors. Such motors typically exhaust through one or more stacks, so the operation and operational levels (including number of pumps on or off) of the pumping station can also be assessed using a thermal imaging camera directed at the stacks or ancillary equipment.

Processing Facilities

Crude oil invariably enters an oil refinery at some point in the network to be processed into gasoline and/or other petroleum products, such as diesels, jet fuels, heating oil, etc. The ability of the various units at the refinery to utilize the incoming crude oil is dependent on the proper functioning of such units. Refineries are highly complex facilities which generally are designed and intended to function year-round on a 24 hour-a-day, 7 day-a-week schedule. However, disruptions and malfunctions of equipment at these facilities occurs on a relatively frequent basis and can have immediate impact on market dynamics. Specifically, if particular units at one or more refineries are off-line, there is a decreased demand for crude oil at the affected refineries and a decreased supply of gasoline and other refined products in markets supplied by affected refineries. So-called refinery unit ramp-downs and ramp-ups are of particular market interest, but, in addition, there is also an interest in the flow rates of crude oil into each refinery and the amount of crude oil in storage at each refinery at any given time.

Therefore, in the method and system of the present invention, the operational status of one or more processing facilities, such as refineries, in the network is ascertained. With respect to the term "processing facilities," this term is also intended to include any facility in a network in which there is some handling of the liquid energy commodity that can be monitored, even if there is no material change to the liquid energy commodity, such as buffering, transfer, or surge overflow facilities. In any event, one preferred method for monitoring the operation of processing facilities is by using fixed thermal imaging cameras. A thermal imaging camera can acquire thermal data and record images of emissions and heat signatures of various key units that can be used to ascertain whether the processing facility is functioning as expected or not.

FIGS. 9(a)-(d) are a series of thermal images illustrating the ramp-down of a fluid catalytic cracking unit (FCCU) at a refinery. As reflected in FIGS. 9(a)-(d), each primary unit at a refinery typically has one or more exhaust stacks associated with it, which generally function as exhausts for heating devices, such as furnaces, heat exchangers, etc., or exhausts for emission control devices, such as wet gas scrubbers, electrostatic dust precipitators, etc. In general, if a particular unit is functioning normally, a characteristic level of heating is observed on a thermal image of the stack. In addition, a characteristic emission via a plume emanating from the top of the stack is also present and visible. When the unit is turned off, or not operating normally, the heating and emissions from such stacks are seen to be either absent completely or display some abnormal characteristics (e.g., excess heating or excess emissions). Similarly, aside from the stacks, a characteristic level of heating can be observed on the thermal images for many other of types of equipment associated with a unit, including, but not limited to, vessels, piping, duct work, heat exchangers, furnaces, and/or ancillary equipment.

Figure 9A:
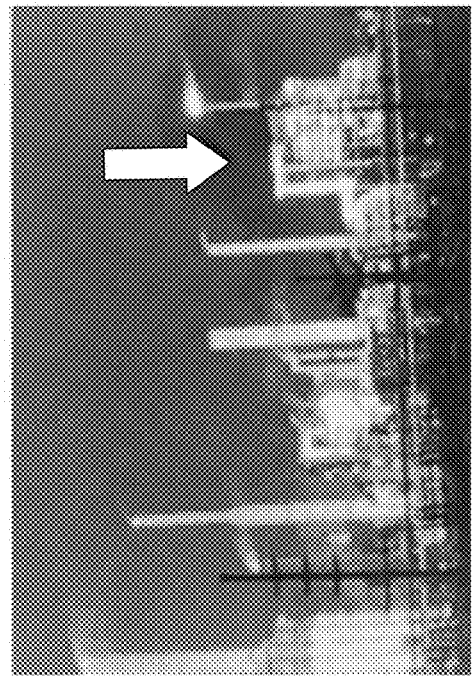
FIGS. 9(a)-(d) are a series of thermal images illustrating the ramp-down of a fluid catalytic cracking unit at a refinery.
Figure 9B:
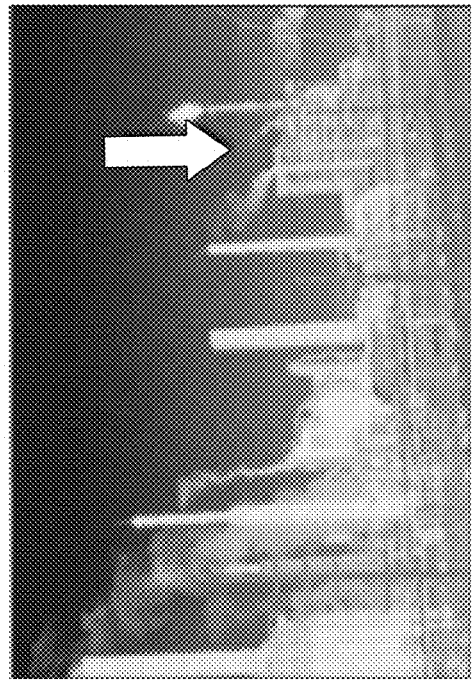
Figure 9C:
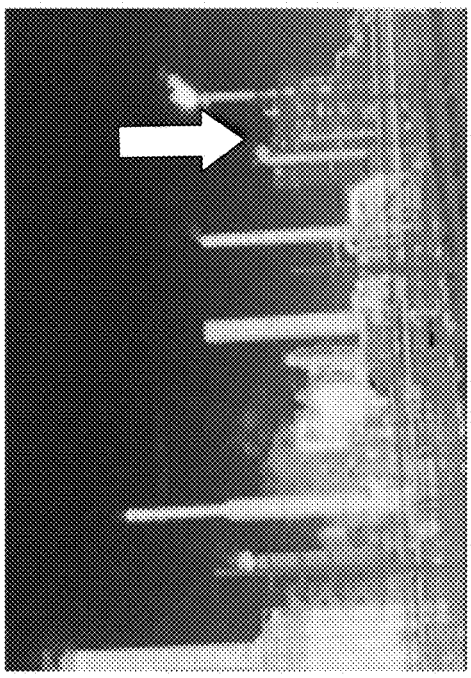
Figure 9D:
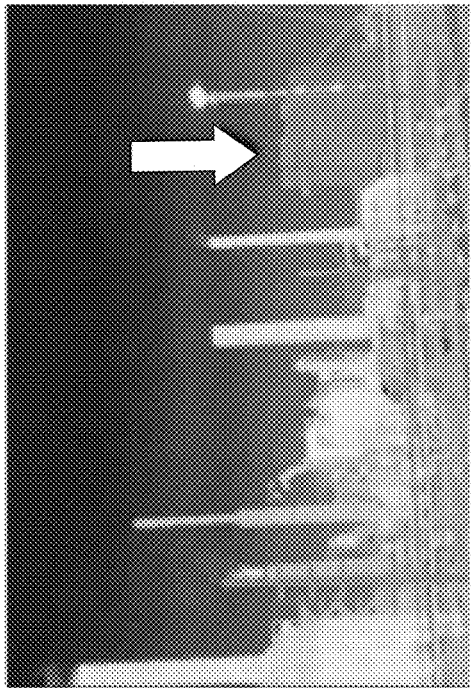

Returning to FIGS. 9(a)-(d), in this particular example, the FCCU is in far right of the image, as illustrated by the arrow. In FIG. 9(a), the FCCU is shown in normal operating mode. As shown in FIG. 9(b), during the start of ramp-down, emissions are seen from a stack in the middle of the FCCU, and the FCCU itself shows relative cooling with respect to neighboring units. In FIG. 9(c), the body of the FCCU shows continuing cooling; the emitting stacks remains hot, but emissions from it are reduced. In 9(d), both FCCU and the stack have completely cooled down, and ramp-down of the FCCU is complete.

Each primary unit at a refinery also has emergency control devices, such as flares, blowdown stacks, and other devices which can burn off or dissipate inline streams of feedstocks, processing chemicals, and associated by-products in the case where the units need to be shut-down rapidly. Such emergency control devices can also be used in the normal operation of such units to control the amounts of feedstocks, processing chemicals, and associated by-products in the process streams. These emergency control devices can also be observed by a thermal imaging camera as operating at characteristically levels (typically low or off) when the associated units are operating normally and at abnormal levels (typically emitting at abnormal and elevated levels) when the associated units are experiencing issues, are being started up, or being shut down.

In any event, thermal images such as those shown in FIGS. 9(a)-(d) can be analyzed visually or by using automated image analysis to ascertain the operational status of the primary units of a refinery. For further discussion of the image analysis techniques that may be utilized, reference is made to commonly assigned and co-pending U.S. patent application Ser. No. 13/269,833 entitled "Method and System for Providing Information to Market Participants About One or More Power Generating Units Based on Thermal Image Data," which is a continuation of U.S. patent application Ser. No. 12/053,139. Each of these patent applications is incorporated herein by reference.

Additionally, while the above discussion is directed to refineries which refine crude oil into gasoline and/or other petroleum products, the monitoring technology is also applicable to such processing facilities as: (a) fractionation facilities, where NGLs are separated from the crude oil for subsequent processing into such products as ethane, propane, and butanes; (b) upgrading facilities (or upgraders), which process raw crude oils after mining and prepare the crude oils for delivery to and subsequent refining at crude oil refineries; (c) ethylene cracking facilities, where NGL products and/or petroleum liquids (such as naphtha) are processed into petrochemical industry feedstocks such as ethylene, propylene, etc.; and (d) natural gas processing facilities, which produce NGL from natural gas.

Balances

Now, having described the monitoring of the three fundamental components of a particular network—(i) storage facilities, (ii) pipelines, and (iii) processing facilities—it is possible to determine total "balances" of the crude oil or other liquid energy commodity. For example, and as mentioned above, "balances" of interest to market participants with respect to crude oil include, but are not limited to: the amount of crude oil in storage in a given market region at a given time; the amount of crude oil flowing into a market region from adjacent market regions; and/or the amount of crude oil being processed into gasoline and other petroleum products.

Referring again to FIG. 1, in order to determine the physical balances of crude oil or other liquid energy commodity in a particular network, the combined data from the monitoring of these three fundamental components can be used to estimate physical balances of interest.

Figure 10:
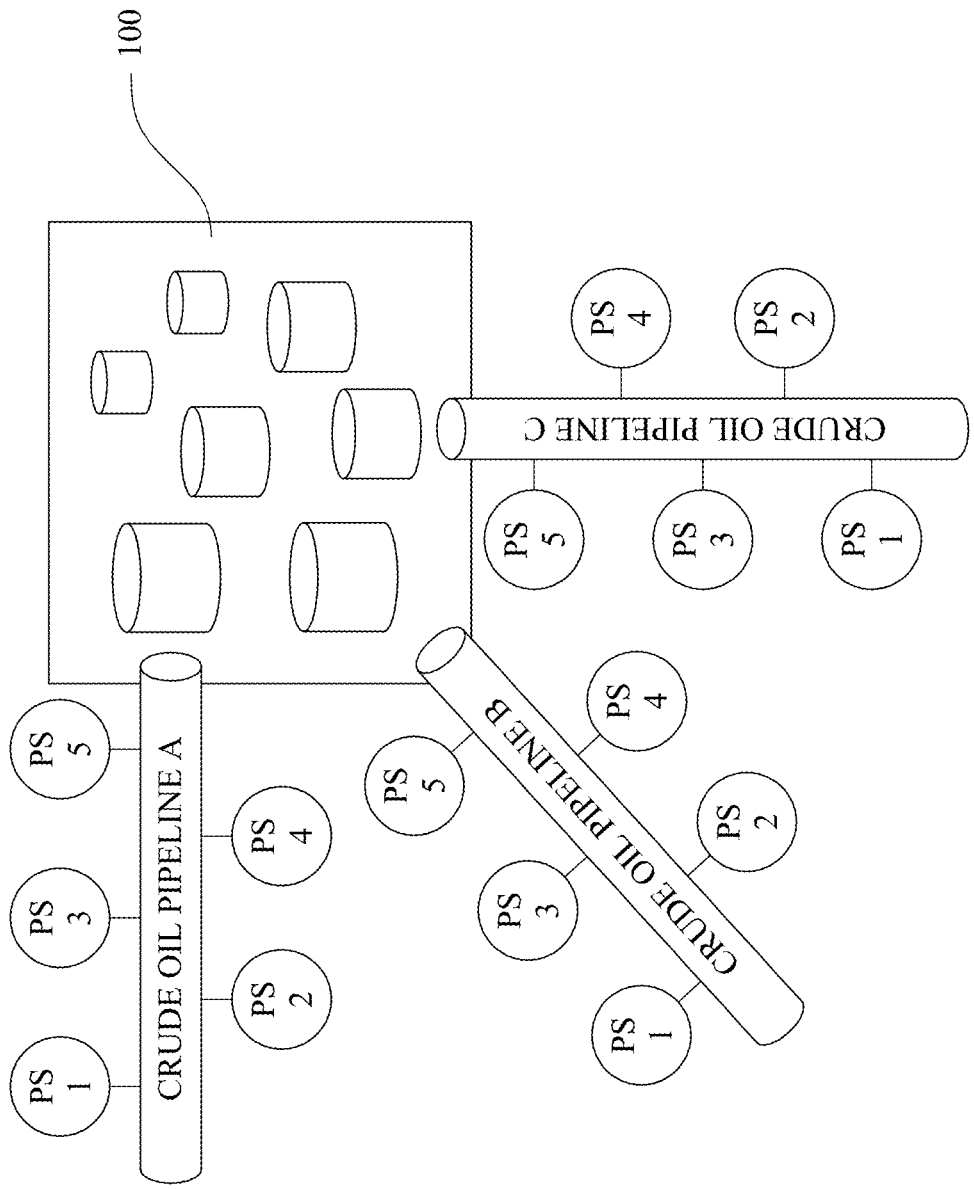
FIG. 10 illustrates a storage hub that is connected to three pipelines.

For example, FIG. 10 illustrates a storage hub (i.e., a collection of storage tanks) 100 that is connected to three pipelines: Pipeline A, Pipeline B, and Pipeline C. Using the techniques of analysis described above, measurement of the amount of crude oil in each storage tank is made, and then a sum of all such measurements yields the collective amount in storage at the storage hub 100 at a given time. Then, a determination of the real-time inflows and outflows of oil into the storage hub 100 can be made on a periodic basis from the data collected from the monitoring devices for the power lines supplying electric power to selected pumping stations along each of the three pipelines. For example, if Pipeline A and Pipeline B are incoming, and Pipeline C is outgoing, a net inflow into the storage hub 100 can be computed from a summation of the inflows less any outflows:

$$\text{NetInflowIntoHub} = (\text{Pipeline } A_{FLOW} + \text{PipelineB}_{FLOW}) - \text{Pipeline } C_{FLOW} \quad (15)$$

Thus, with the measurement of the collective amount in storage at the storage hub 100 at a given time and subsequent periodic determinations of inflows and outflows, a substantially real-time determination can be made as to the amount of crude oil in storage at the storage hub 100 at a given time. Furthermore, additional modeling may then be possible to determine operational parameters, such as the effect on storage levels at the storage hub 100 for various operational conditions of the incoming and outgoing pipelines, the use of certain storage tanks to contain crude oil from certain pipelines, what crude oil is in transit through the storage hub 100 and what crude oil stays at the storage hub 100.

For another example, data collected from the monitoring devices for the power lines supplying electric power to selected pumping stations (PS1, PS2, PS3, PS4, PS5) along each of the pipelines can be combined with information obtained from the analysis of thermal images of a refinery (not shown) connected to the pipelines to determine the balances of crude oil in transit to the refinery, in storage at the refinery, and being processed at the refinery at any given time.

Figure 11:
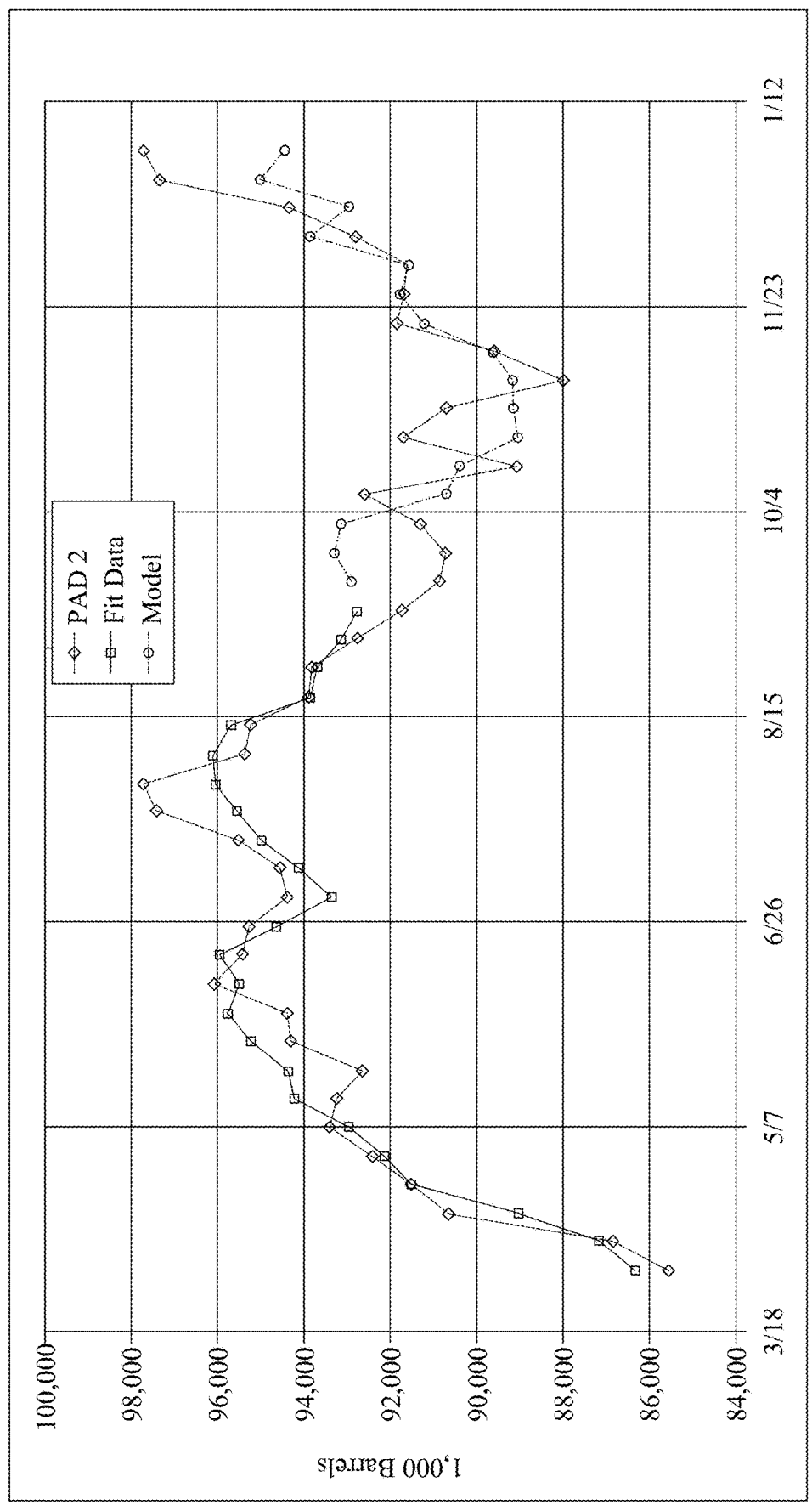
FIG. 11 is a plot illustrating how directly measured data is fitted using a standard mathematical regression model to historic data.

It is further contemplated that, in addition to combining directly measured data collected at different locations in a particular network as described above, data can also be obtained from third-party and publicly available data sources, such as that provided by the United States Energy Information Administration ("HA"), to deliver estimations and predictions of parameters of market interest related to commodity supply, demand, and storage. For example, one such parameter of interest is the total volume of crude oil in storage in the PAD 2 market region at any given time. EIA publishes an amount for this value weekly, typically on Wednesday morning at 10:30 AM EST. Directly measured data and EIA data can be effectively combined using a standard mathematical regression model. Specifically, the standard mathematical regression model is used to fit the directly measured data to the historic PAD 2 crude oil storage inventory data published by EIA. The determined PAD 2 crude oil inventories are then estimated going forward using the resultant model. Referring now to FIG. 11, in one example, directly measured data is obtained using the techniques described above for: (i) the storage levels at a major PAD 2 storage hub; (ii) the crude oil flow rates into PAD 2 (collected from six pipelines entering the PAD 2 region from PAD 3); and (iii) refinery unit operational data (collected from nine PAD 2 refineries). This directly measured data is then fitted using a standard mathematical regression model to historic PAD 2 crude oil storage inventory data published by EIA. The determined crude oil inventories based on the model output ("Model" line in FIG. 11) can then be compared to actual PAD 2 crude oil inventory data ("PAD 2" line in FIG. 11), and PAD 2 crude oil inventories can then be estimated going forward using the resultant model.

Figure 12:
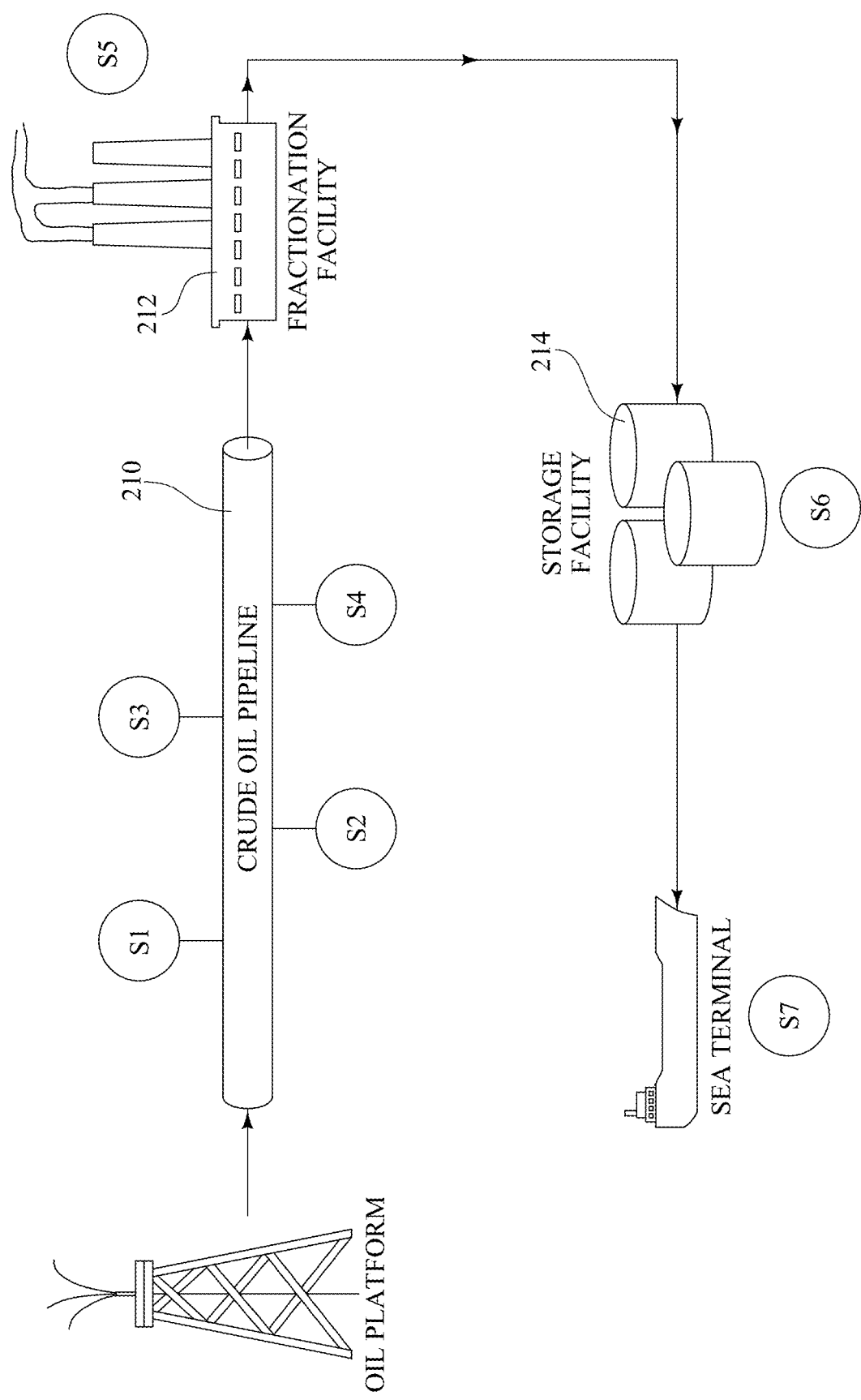
FIG. 12 is a schematic view of another exemplary network associated with crude oil production.

For another example, FIG. 12 is a schematic view of another exemplary network associated with crude oil production. In FIG. 12, crude oil originating from an oil platform 200 (or other production source) is delivered to a pipeline 210. Along the pipeline 210, there are four sensor locations—S1, S2, S3, S4, as further described below in Table 2. The pipeline 210 is then connected and delivers the crude oil to a fractionation facility 212, which is monitored by a sensor S5, as also described below in Table 2. From the fractionation facility 212, crude oil flows to a storage facility 214, which is monitored by sensor(s) S6, as also described below in Table 2.

Finally, in this exemplary implementation, there is an additional data input, as represented in FIG. 12 by S7. This additional data input, S7, is used to further verify the collected data and results of the various computational analyses. Specifically, in the exemplary network shown in FIG. 12, crude oil in the storage facility 214 is delivered to one or more ships at a sea terminal for export. Much data about ships that transfer crude oil is publicly known and available, including ship capacity and ship location via Automatic Identification System (AIS) ship tracking services. While a particular ship is in port at the sea terminal, a visual camera or an infrared camera can be used to estimate flow rate of oil delivered to the particular ship by measuring the change in ship draft (i.e., the change in ship position relative to the waterline) over time. That delivery of oil should be equal to the reduction in oil level in the storage facility 214. Of course, such technology can be similarly used when ships are delivering oil to a storage facility.

TABLE 2

| | Monitored Component | Sensor Type | Output |
|---|---|---|---|
| S1 | Pumping Station 1 | Power Monitoring Device | mW/Flow Rate |
| S2 | Pumping Station 2 | Thermal Imaging Camera | Operational Status (On/Off) |
| S3 | Pumping Station 3 | Power Monitoring Device | mW/Flow Rate |
| S4 | Pumping Station 4 | Thermal Imaging Camera | Operational Status (On/Off) |
| S5 | Fractionation Facility | Thermal Imaging Camera | Operational Status (On/Off) |
| S6 | Storage Facility/Tank(s) | Thermal Imaging Camera(s) | Level/Volume |
| S7 | Ship | Visual or Thermal Imaging Camera(s) | Draft/Flow Rate |

Figure 13:
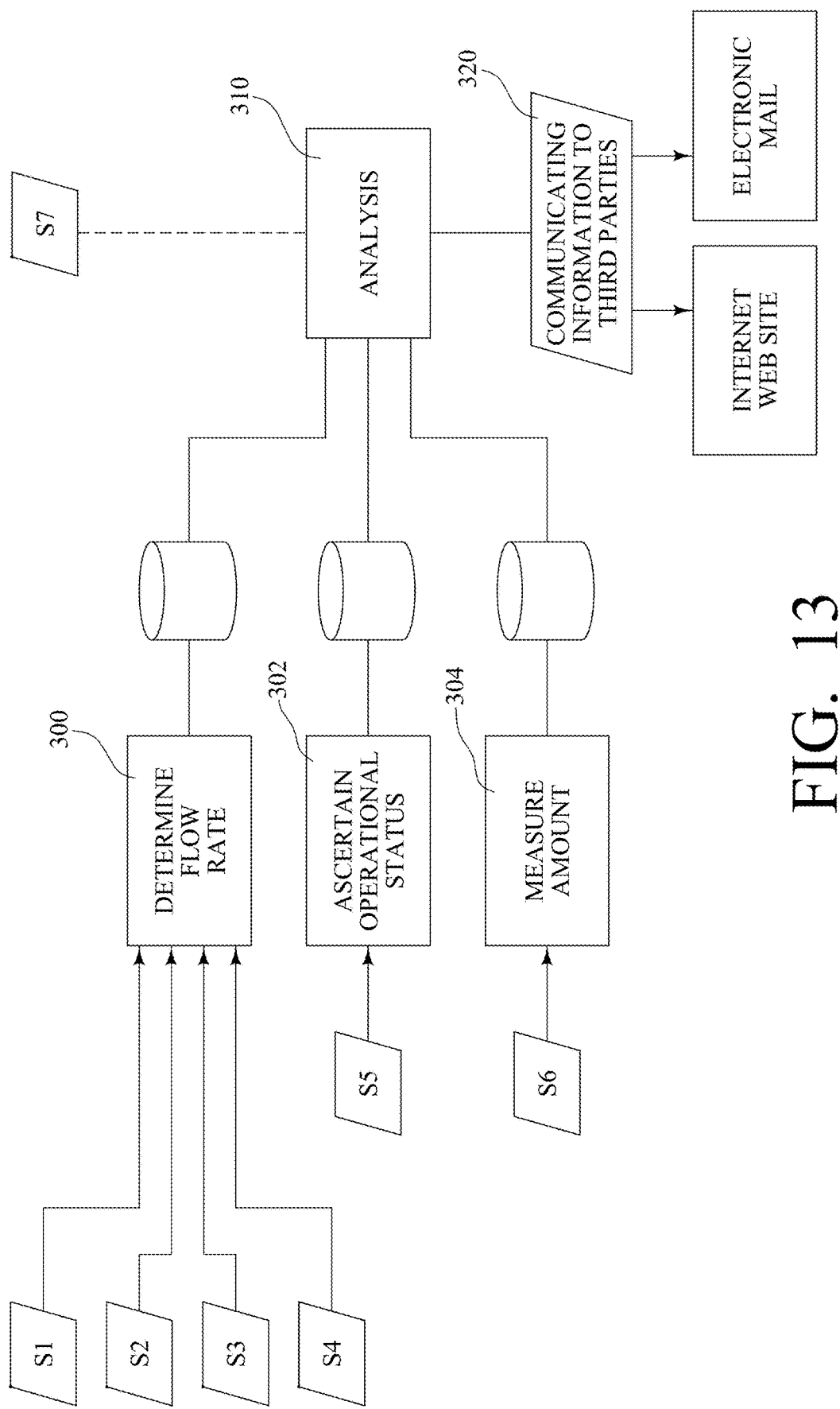
FIG. 13 is a flow chart depicting the general functionality of an implementation of the method and system of the present invention in connection with the exemplary network of FIG. 12.

Referring now to FIG. 13, the outputs from S1, S2, S3, and S4 are used to determine power changes at each pumping station along the pipeline 210, which can then be used to determine flow rate of the crude oil through the pipeline 210, as indicated by block 300 of FIG. 13, and that flow rate data is stored in a database at a central data processing facility. The output from S5 is used to determine the operational status of the fractionation facility 212, as indicated by block 302 of FIG. 13, and that operational status information in also stored in database at the central data processing facility. The output from S6 is used to measure an amount of the crude oil in storage at the storage facility 214, as indicated by block 304 of FIG. 13, and that measurement data is also stored in a database at the central data processing facility.

At the central data processing facility, an analysis is performed on the flow rate data, the operational status information, and the measurement data to determine total "balances" of the crude oil in different functional parts of the network, as indicated by block 310 of FIG. 13. For example, with respect this exemplary network, "balances" of interest to market participants would include, but are not limited to: the amount of crude oil flowing into the network at a given time, the amount of crude oil in storage in the network at a given time; and/or the amount of crude oil flowing out of the network at a given time.

Referring still to FIG. 13, once the analysis has been completed, information about the balance of the crude oil in the network can be communicated to market participants and other interested parties, i.e., third parties who would not ordinarily have ready access to such information, as indicated by block 320. It is contemplated and preferred that such communication to third-party market participants could be achieved through electronic mail delivery and/or through export of the data to an access-controlled Internet web site, which third-party market participants can access through a common Internet browser program, such as Microsoft Internet Explorer®. Of course, communication of information and data to third-party market participants may also be accomplished through a wide variety of other known communications media without departing from the spirit and scope of the present invention.

Figure 14:
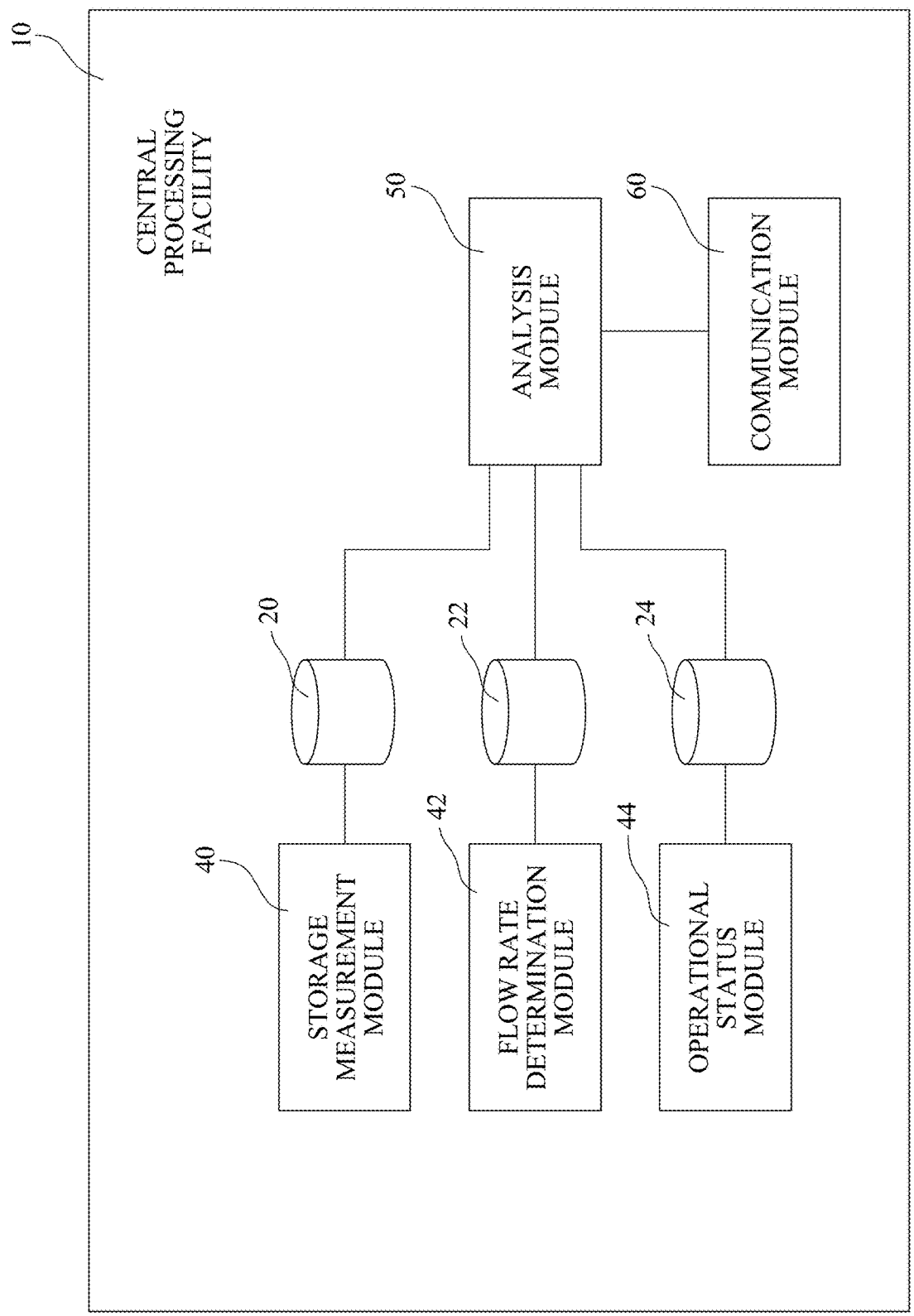
FIG. 14 is a schematic representation of the core components in an exemplary implementation of the method and system of the present invention.

FIG. 14 is a schematic representation of the core components in an exemplary implementation of the method and system of the present invention. As shown in FIG. 14, the central data processing facility 10 includes a first database 20, a second database 22, and a third database 24. Of course, these databases 20, 22, 24 could be integrated into a single database at the central data processing facility 10. Furthermore, the central data processing facility 10 hosts a digital computer program, i.e., computer-readable instructions stored and executed by a computer, that includes appropriate modules for executing the requisite routines and subroutines for performing the operational steps of the present invention. Thus, an exemplary system for determining an amount of a liquid energy commodity stored in a tank in accordance with the present invention includes: (a) a storage measurement module 40 for receiving and analyzing collected images of one or more storage facilities to measure an amount of the liquid energy commodity in storage at each of the one or more storage facilities, and storing that measurement data in a first database 20; (b) a flow rate determination module 42 for receiving and processing measurements of the electric potential and magnetic flux densities associated with power lines for pumping stations on a pipeline to determine a flow rate of the liquid energy commodity in each selected pipeline, and storing that flow rate data in a second database 22; (c) an operational status module 44 for receiving and processing information about an operational status of a processing facility and storing that operational status information in a third database 24; (d) an analysis module 50 for querying the databases 20, 22, 24 and analyzing the measurement data, the flow rate data, and the operational status information to determine a balance of the liquid energy commodity in the network or a selected portion thereof at a given time; and (e) a communications module 60 for communicating information about the liquid energy commodity to a third-party market participant.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for collecting and analyzing operational information from a network of components associated with a liquid energy commodity, comprising the steps of:
   measuring an amount of the liquid energy commodity in storage at one or more storage facilities in the network, and storing that measurement data in a first database;
   determining a flow rate of the liquid energy commodity in one or more selected pipelines in the network by positioning a device to monitor at least one pumping station associated with each of said one or more pipelines, storing such flow rate data in a second database;
   ascertaining an operational status of one or more processing facilities by positioning a thermal imaging camera to acquire thermal data from one or more stacks of each of the one or more processing facilities in the network, and storing that operational status information in a third database;
   analyzing the measurement data, the flow rate data, and the operational status information to determine a total balance of the liquid energy commodity in the network or a selected portion thereof at a given time; and
   communicating information about the total balance of the liquid energy commodity to a third-party market participant.

2. The method as recited in claim 1, in which the liquid energy commodity is crude oil.

3. The method as recited in claim 1, in which the liquid energy commodity is natural gas liquid.

4. The method as recited in claim 1, in which the first database, the second database, and the third database are maintained at a central data processing facility.

5. The method as recited in claim 1, in which the step of measuring the amount of the liquid energy commodity in storage comprises the sub-steps of:
   periodically conducting an inspection of one or more tanks of a particular storage facility, including collecting one or more images of each tank;
   transmitting the collected images of each tank to a central data processing facility; and
   analyzing the collected images of each tank to determine a liquid level for each tank.

6. The method as recited in claim 5, wherein the collected images are infrared images acquired by a thermal imaging camera.

7. The method as recited in claim 5, wherein the inspection of one or more tanks of the particular storage facility and the collection of one or more images of each tank is conducted via satellite imaging.

8. A method for collecting and analyzing operational information from a network of components associated with a liquid energy commodity, comprising the steps of:
   measuring an amount of the liquid energy commodity in storage at one or more storage facilities in the network, and storing that measurement data in a first database;
   determining a flow rate of the liquid energy commodity in one or more selected pipelines in the network, and storing that flow rate data in a second database;
   ascertaining an operational status of one or more processing facilities by positioning a thermal imaging camera to acquire thermal data from one or more stacks of each of the one or more processing facilities in the network, and storing that operational status information in a third database;
   analyzing the measurement data, the flow rate data, and the operational status information to determine a total balance of the liquid energy commodity in the network or a selected portion thereof at a given time; and
   communicating information about the total balance of the liquid energy commodity to a third-party market participant.

9. The method as recited in claim 8, in which the liquid energy commodity is crude oil.

10. The method as recited in claim 8, in which the liquid energy commodity is natural gas liquid.

11. The method as recited in claim 8, in which the first database, the second database, and the third database are maintained at a central data processing facility.

12. The method as recited in claim 8, in which the step of measuring the amount of the liquid energy commodity in storage comprises the sub-steps of:
   periodically conducting an inspection of one or more tanks of a particular storage facility, including collecting one or more images of each tank;
   transmitting the collected images of each tank to a central data processing facility; and
   analyzing the collected images of each tank to determine a liquid level for each tank.

13. The method as recited in claim 12, wherein the collected images are infrared images acquired by a thermal imaging camera.

14. The method as recited in claim 12, wherein the inspection of one or more tanks of the particular storage facility and the collection of one or more images of each tank is conducted via satellite imaging.

* * * * *